United States Patent
Brouillet et al.

(10) Patent No.: US 7,495,361 B2
(45) Date of Patent: Feb. 24, 2009

(54) ELECTRIC MACHINE ARRANGEMENT

(75) Inventors: David Brouillet, St. Basile le Grand (CA); Vittorio Bruno, Mississauga (CA)

(73) Assignee: Pratt & Whitney Canada Corp., Longueuil, Québec (CA)

(*) Notice: Subject to any disclaimer, the term of this patent is extended or adjusted under 35 U.S.C. 154(b) by 541 days.

(21) Appl. No.: 10/981,457

(22) Filed: Nov. 5, 2004

(65) Prior Publication Data

US 2006/0099095 A1 May 11, 2006

(51) Int. Cl.
*H02K 5/16* (2006.01)
(52) U.S. Cl. .......................... 310/90; 310/118
(58) Field of Classification Search ............. 310/89–91, 310/113–118
See application file for complete search history.

(56) References Cited

U.S. PATENT DOCUMENTS

| | | | |
|---|---|---|---|
| 3,614,039 A | 10/1971 | Norberg et al. | |
| 4,223,263 A | 9/1980 | Hansen, Jr. et al. | |
| 4,388,004 A | 6/1983 | Bellati | |
| 4,525,995 A | 7/1985 | Clark | |
| 4,713,982 A | 12/1987 | Fluegel et al. | |
| 4,728,841 A | 3/1988 | Sugden | |
| 4,797,590 A | 1/1989 | Raad et al. | |
| 4,965,477 A | 10/1990 | Stadler et al. | |
| 4,990,807 A | 2/1991 | Flygare et al. | |
| 5,191,254 A | 3/1993 | Raad et al. | |
| 5,767,586 A | 6/1998 | Schwanda | |
| 6,204,577 B1 * | 3/2001 | Chottiner et al. ............... | 310/42 |
| 6,838,779 B1 * | 1/2005 | Kandil et al. .................. | 290/31 |
| 7,131,275 B2 * | 11/2006 | Gustafson ..................... | 60/788 |
| 2004/0107703 A1 | 6/2004 | Gustafson | |

FOREIGN PATENT DOCUMENTS

EP 0 540 192 A1 5/1993
WO WO 2005/073540 A1 8/2005

* cited by examiner

*Primary Examiner*—Thanh Lam
(74) *Attorney, Agent, or Firm*—Ogilvy Renault LLP

(57) ABSTRACT

The electric machine comprises a rotor configured and disposed to be attached at the free end of a shaft of another device, which free end is adjacent to at least one bearing coaxially mounted around the shaft and positioned intermediate opposite radial sides of the rotor.

15 Claims, 2 Drawing Sheets

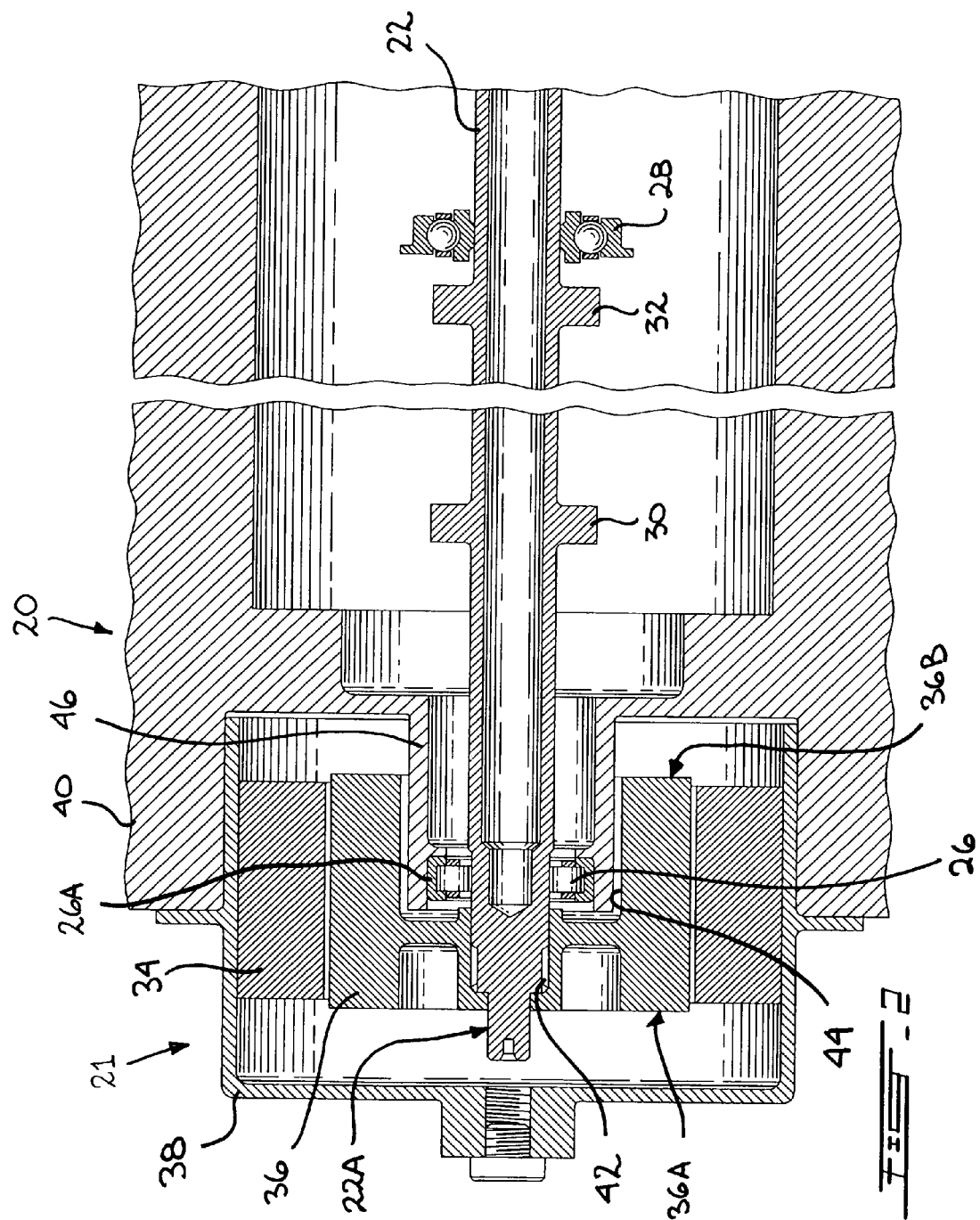

ELECTRIC MACHINE ARRANGEMENT

TECHNICAL FIELD

The technical field of the invention relates generally to electric machine arrangements, in particular to the internal configuration of electric motor/generators.

BACKGROUND

Typically, aircraft gas turbine engines are equipped with various mechanically-driven accessories which are connected to a casing referred to an accessory gearbox (AGB). These accessories rotate at a very high speed compared to most common rotatable devices in other contexts. They are also subjected to intense thermal and mechanical stresses during their operation. The starter generator is one such accessory.

Since there is a continuing need to reduce the complexity and weight of all aspects of aircraft engines, and opportunities continue to exist in this regard for electric machine arrangements as well.

SUMMARY

To save space and weight, the rotor of the electric machine is supported on the free end of the shaft projecting from another device, for instance an AGB. It should be noted, however, that the present invention can be used in a wide range of applications and is not necessarily limited to its use in a gas turbine engine.

A first aspect of the present invention relates to an electric machine comprising: a stator and a rotor coaxially mounted with reference to the stator, the rotor being configured and disposed to be coaxially positioned at a free end of a shaft projecting from another device, the free end of the shaft being adjacent to a bearing of the other device, the rotor having two opposite radial sides that are axially-spaced relative to the shaft and between which the bearing of the other device is located.

Another aspect of the present invention relates to a support system for an electric machine, the electric machine comprising a stator and a rotor, the rotor being configured and disposed to be attached at a free end of a shaft, the rotor having two opposite radial sides that are axially-spaced relative to the shaft, the support system comprising: at least one bearing coaxially mounted adjacent to the free end of the shaft and positioned intermediate the opposite radial sides of the rotor.

Another aspect to the present invention relates to a method of supporting a rotor of an electric machine at a free end of a shaft, the rotor having two opposite radial sides that are axially-spaced relative to the shaft, the method comprising: providing at least one bearing adjacent to the free end of the shaft, the bearing having an outer portion connected to a base; and mounting the rotor to the bearing, the rotor being positioned so that the bearing be located intermediate the opposite radial sides of the rotor.

Still other features and advantages of the present invention will be better understood with reference to the following detailed description.

DESCRIPTION OF THE DRAWINGS

FIG. 2 is a semi-schematic cross-sectional view of an electric machine incorporating the new arrangement.

DETAILED DESCRIPTION

Figure 1:
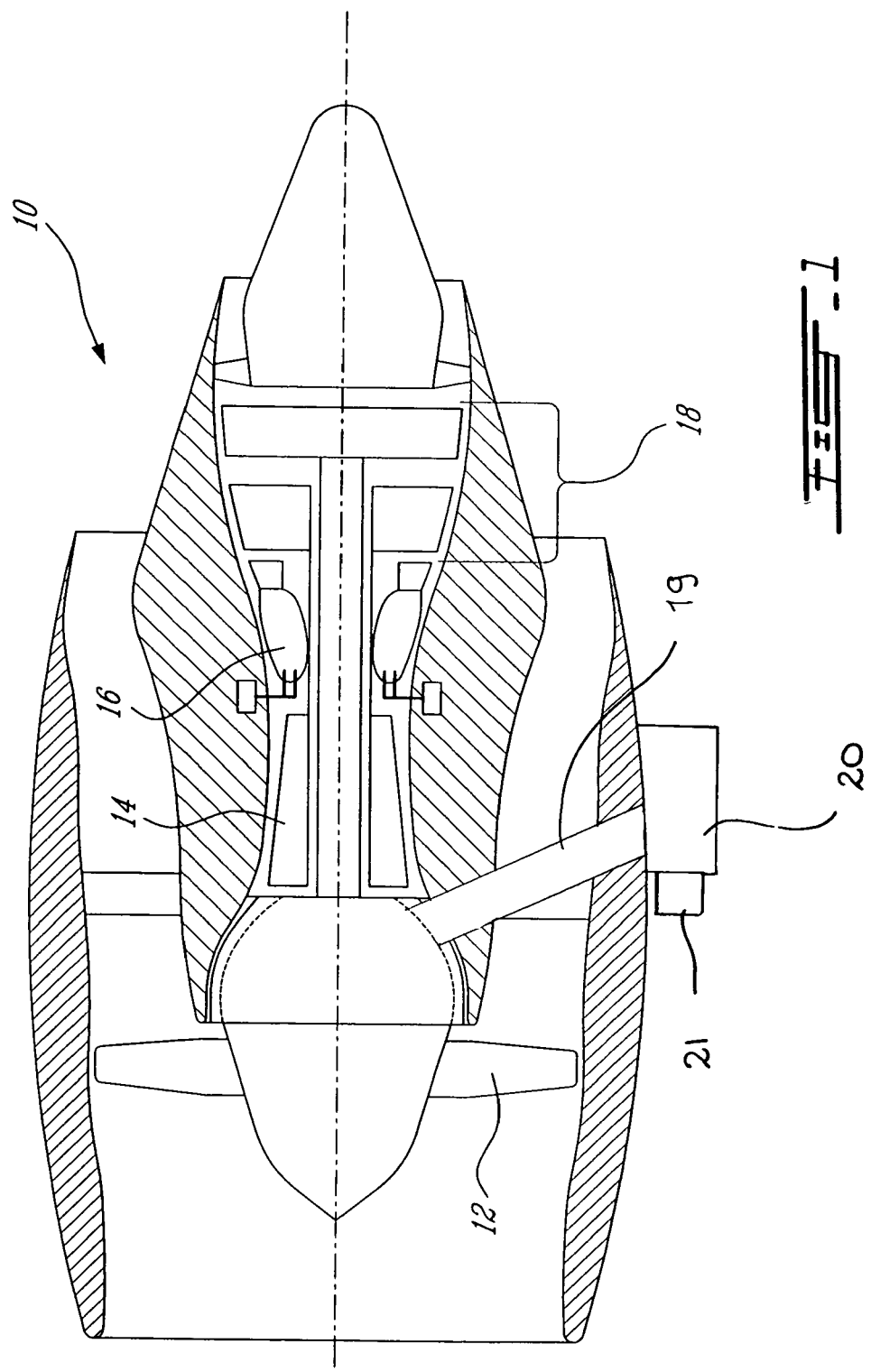
FIG. 1 schematically shows a generic gas turbine engine to illustrate an example of a general environment in which the electric machine arrangement can be used.

FIG. 1 illustrates an example of a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. FIG. 1 thus shows an example of an environment in which the electric machine can be used. In that context, the electric machine can be an electric accessory, such as a starter/generator unit, a generator unit or a starter unit, that is connected to an accessory gearbox (AGB), itself driven by an arrangement which generally includes a tower shaft 19 mechanically connected to another rotating component. FIG. 1 shows an AGB 20 having a starter/generator 21 mounted thereto. As aforesaid, the electric machine arrangement can be used in other contexts and environments.

FIG. 2 semi-schematically illustrates the interior of the electric machine 21 and the relationship between a main shaft 22 of the AGB 20 and the electric machine 21. The shaft 22 itself is supported by at least two opposite bearings 26,28, at least one of which is positioned at a given distance from one of its ends so as to provide a free end 22A. Additional bearings (not shown) can be positioned along the shaft 22, if required. The shaft 22 is mechanically connected to other mechanical components in the AGB 20 using appropriate mechanical connectors, for instance a set of gears 30,32.

The electric machine 21 comprises a stator 34 and a rotor 36 coaxially mounted with reference to the stator 34. These parts are provided within an outer protective casing 38 partially inserted in a recess of the main casing 40 of the AGB 20. In the illustrated example, the stator 34 surrounds the rotor 36. It should be noted at this point that it is also possible to provide the stator 34 inside the rotor 36 in some designs.

As its name indicates, the stator 34 is not rotating. It is rather connected to a base, either directly or through another element, such as the outer protective casing 38. The base in the illustrated example is the main casing 40 of the AGB 20. The rotor 36 is rigidly attached to the free end 22A of the shaft 22 using an appropriate mechanical connector, for instance a set of splines 42. The rotor 36 is coaxially mounted with reference to the shaft 22 so that it can rotate at a very high speed with minimal vibrations.

In the illustrated arrangement, the bearing 26 that is adjacent to the free end 22A of the shaft 22 is designed to be positioned intermediate the axially-spaced and opposite radial sides 36A,36B of the rotor 36. A recess 44 is provided inside the rotor 36 to accommodate the bearing 26 and a hollow cylindrical extension 46 projecting from the AGB casing 40. The bearing 26 comprises an outer portion 26A which is attached to the AGB casing 40.

Using the support system and the arrangement as described herein, the electric machine 21 can be rotated at very high speeds with fewer parts than with conventional arrangements. Also, in addition to the weight and space savings, reducing the total number of bearings increases the reliability since there are fewer bearings to wear out, which is particularly important in adverse conditions such as the ones found in a gas turbine engine.

Overall, providing at least one bearing 26 adjacent to the free end 22A of the shaft 22 and attaching the rotor 36 to the free end 22A of the shaft 22 so that the bearing 26 be located intermediate opposite radial sides 36A,36B of the rotor 36 is a highly suitable method of mounting a rotor 36 in an electric machine 21.

The above description is meant to be exemplary only, and one skilled in the art will recognize that changes may be made without departing from the scope of the invention disclosed. For example, the present invention is not limited to the use of a single bearing 26 near the free end 22A of the shaft 22 since two or more bearings 26 can be positioned side-by-side at that location. It is not limited to its use in the context of the gas turbine engine. The rotor 36 can be either located inside or outside the stator 34. Still other modifications will be apparent to those skilled in the art, in light of a review of the present disclosure, and such modifications are intended to fall within the scope of the appended claims.

What is claimed is:

1. An electric machine apparatus for a gas turbine engine, the apparatus comprising:
    an accessory gearbox (AGB) having a shaft protruding from a casing housing the AGB, the shaft supported by at least two bearings inside the AGB casing, the portion of the shaft protruding from the casing terminating outside the casing in a free end of the shaft;
    a stator mounted to the casing around the free end of the shaft; and
    a rotor coaxially mounted with reference to the stator, the rotor coaxially mounted to and entirely supported by the free end of the shaft projecting from the AGB.

2. The electric machine apparatus of claim 1, wherein the electric machine apparatus is an electric accessory of a gas turbine engine.

3. The electric machine apparatus of claim 2, wherein the electric machine apparatus is a starter/generator unit.

4. The electric machine apparatus of claim 1 wherein the stator is disposed around a portion of the AGB casing.

5. The electric machine apparatus of claim 4, wherein one of said bearings inside the AGB casing is in said portion of the casing around which the stator is disposed.

6. The electric machine apparatus of claim 5, wherein only one of said bearings inside the AGB casing is in said portion of the casing around which the stator is disposed.

7. The electric machine apparatus of claim 6, wherein the stator extends cylindrically between first and second axial ends, and wherein the one of said bearings is disposed axially between said first and second axial ends of the stator.

8. The electric machine apparatus of claim 1, wherein the rotor is disposed around a portion of the AGB casing.

9. The electric machine apparatus of claim 8, wherein one of said bearings inside the AGB casing is in said portion of the casing around which the rotor is disposed.

10. The electric machine apparatus of claim 9, wherein only one of said bearings inside the AGB casing is in said portion of the casing around which the rotor is disposed.

11. The electric machine apparatus of claim 10, wherein the rotor extends cylindrically between first and second axial ends, and wherein said only one of said bearings is disposed axially between said first and second axial ends of the rotor.

12. The electric machine apparatus of claim 9, wherein a recess is provided inside the rotor to accommodate the free end and the bearing.

13. The electric machine apparatus of claim 9, wherein the rotor extends cylindrically between first and second axial ends, and wherein one of said bearings is disposed axially between said first and second axial ends of the rotor.

14. The electric machine apparatus of claim 10, wherein said portion of the casing is a hollow cylindrical extension projecting from the AGB casing.

15. The electric machine apparatus of claim 1, wherein the rotor extends cylindrically between first and second axial ends, and wherein the free end of the shaft extends through both the first and second rotor ends.

* * * * *